United States Patent [19]

Twerdochlib

[11] Patent Number: 4,777,979
[45] Date of Patent: Oct. 18, 1988

[54] POSITION DETECTOR FOR CLAPPER OF NON-RETURN VALVE

[75] Inventor: Michael Twerdochlib, Oviedo, Fla.

[73] Assignee: Westinghouse Electric Corp., Pittsburgh, Pa.

[21] Appl. No.: 121,813

[22] Filed: Nov. 16, 1987

[51] Int. Cl.4 .............................................. F16K 37/00
[52] U.S. Cl. ..................................... 137/554; 324/207; 340/870.31; 137/527.8
[58] Field of Search ...................... 137/554, 527, 527.8; 324/207, 208; 340/870.31, 870.36

[56] References Cited

U.S. PATENT DOCUMENTS

| 3,017,621 | 1/1962 | Taborsky | 340/282 |
| 3,857,277 | 12/1974 | Moore | 137/554 X |
| 3,859,619 | 1/1975 | Ishihara et al. | 137/554 X |
| 3,896,280 | 7/1975 | Blake | 137/554 X |
| 4,316,145 | 2/1982 | Tann | 324/208 |
| 4,353,523 | 10/1982 | Palti | 251/65 |
| 4,468,559 | 8/1984 | Hurst et al. | 137/554 X |
| 4,569,365 | 2/1986 | Namand et al. | 137/554 |
| 4,600,034 | 7/1986 | Ko | 137/554 |
| 4,618,824 | 10/1986 | Magee et al. | 137/554 X |
| 4,639,668 | 1/1987 | Petit et al. | 324/208 |

FOREIGN PATENT DOCUMENTS

| 1153114 | 8/1983 | Canada | 137/554 |
| 2095407 | 9/1982 | United Kingdom | 137/554 |

Primary Examiner—John Rivell
Attorney, Agent, or Firm—D. C. Abeles

[57] ABSTRACT

A non-return valve for a steam turbine steam line includes a housing and a clapper swingably mounted in the housing for angular movement between open and closed positions. A metal proximity detector is mounted on the interior surface of the cover for the valve access opening and adjacent the open position of the valve. Movement of the clapper away from its open position results in a signal providing an indication that the valve clapper is away from its open position.

5 Claims, 2 Drawing Sheets

POSITION DETECTOR FOR CLAPPER OF NON-RETURN VALVE

BACKGROUND OF THE INVENTION

1. Field of the Invention

This invention relates to non-return valves of the sort typically employed in the extraction lines of a steam turbine steam system and in particular to a monitor for indicating the presence and/or position of the clapper of the non-return valve.

2. STATE OF THE RELEVANT ART

The present invention has particular utility in connection with the steam lines associated with a steam turbine. Such turbines are generally and conventionally employed for the purpose of rotating large generators for generating electrical power. Problems with such turbine-generators arising out of the induction of water or cool vapor into the steam turbines become more critical as the units age and particularly as they are used, increasingly, for cycling and/or shift operation. Malfunctions of the equipment in the heat cycle can cause such induction to occur at various locations, including the main steam inlet piping, the hot-reheat steam inlet piping, the cold-reheat steam piping, extraction connections, gland steam-sealing system, and turbine drains. Beyond the resulting structural damage and mechanical malfunction caused by the induction of water or cool vapor into the generator, the resulting unscheduled down time of the equipment is a matter of serious concern.

Water induction incidents have become of such concern that the ASME (American Society of Mechanical Engineers) has established a committee on turbine water-damage and plant design recommendations to prevent water damage are contained in ANSI/ASME Standard No. TDP-1-1985. More recently, studies done for the EPRI on actual operating power generating facilities are set forth in a final report prepared and released by EPRI as Report CS-4285, entitled "Detection of Water Induction in Steam Turbines. Phase III; Field Demonstration." These studies emphasize the continuing, critical need for the monitoring of systems used in the environment of steam turbines, to assist in the prevention of the severe problem of water induction.

By far the extraction line, heater, and cold-reheat lines are responsible for the vast majority of the water induction incidents. And one means which has been provided for prevention or at least minimizing the effect of water induction has been to install non-return valves within the steam turbine extraction lines. Such valves permit flow in one direction and prevent or at least inhibit, flow in the opposite direction. The use of such valves is well known and does not form a part of the present invention.

A significant problem associated with the use of non-return valves is that the same may break in the hostile environment of the steam system associated with steam turbines. These valves and other stationary and non-stationary components within the steam lines and vessels can fail without showing any external evidence of failure. For non-return valves, failure modes may include galling of the claper which prevents its closure and oscillation of the clapper severe enough to cause the clapper to break loose and be carried downstream toward the heater. Not only is damage to the valve itself a concern, but if such failure goes undetected for a long period of time, an ultimate result could be a major turbine failure due to a water induction incident.

SUMMARY OF THE INVENTION

The present invention provides a means for detecting whether or not a non-return valve, or other device, is operating properly. For this purpose, the invention provides a steam turbine steam line non-return valve comprising a housing, a clapper swingably mounted in the housing for angular movement between valve open and valve closed positions, and a metal proximity detector. The detector includes electrically responsive means mounted within the valve housing adjacent the open position of the clapper for providing a change in electrical signal whenever the clapper is not located at its open position. In a preferred form of the invention, the valve includes an access opening and a cover for such opening. The electrically responsive means is mounted on the interior surface of the access opening cover. The electrically responsive means preferably comprises at least one coil which is generally circular in form and the same is preferably disposed to extend along the interior surface of the access cover. In a specifically preferred form of the invention, the electrically responsive means comprises a single coil element which is generally circular in form and contained in a ceramic housing mounted flush against the interior surface of the cover for the valve access opening.

DETAILED DESCRIPTION OF THE DRAWINGS

DESCRIPTION OF THE PREFERRED EMBODIMENTS

Figure 1:
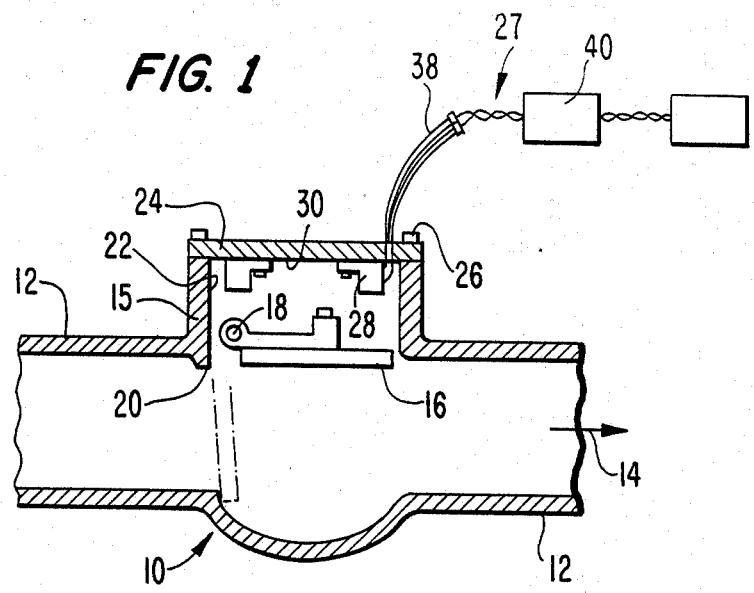
FIG. 1 is a cross-sectional, schematic view of a non-return valve mounted in a steam line and embodying the proximity detector and monitor of the present invention.

A non-return valve 10 suitable for use in connection with a steam line 12 associated with a steam turbine (not shown), is illustrated in FIG. 1. The direction of normal flow of steam in line 12 is illustrated by the arrow 14. The valve, which is conventional insofar as its mechanical characteristics are concerned, includes a housing 15 and a clapper element 16. The clapper element 16 is swingably mounted in housing 15 for angular movement about the axis of a mounting pin 18 between an open position as illustrated by solid lines in FIG. 1 and a closed position as illustrated by the dashed lines in FIG. 1. When the clapper element 16 is in its closed position, it closes the port 20 of valve 10 so as to prevent flow of steam in a direction opposite to the direction of arrow 14.

As is known to those skilled in the art to which the present invention pertains, the clapper 16 of valve 10 may respond to flow, gravity forces and/or an external closing action. The flow of steam in the direction of arrow 14 tends to hold clapper 16 in its open position whereas flow in the opposite direction coupled with gravitational forces and/or an external closing action causes the clapper 16 to rotate about pin 18 into its closed position indicated by the dashed lines in FIG. 1. Additionally, valves such as the valve 10 may be equipped with known operating devices which, in response to conditions in the system, may be operably connected to clapper 16 to close rotation of the same about the pin 18 and between the open and closed positions thereof. Such device might, for example, respond to conditions which are indicative of an impending water induction occurrence so as to close valve 10 before the flow in line 12 actually is reversed by the water induction incident.

Housing 15 has an access opening 22, which, as shown in FIG. 1, is closed by a cover 24. As illustrated in FIG. 1, cover 24 may normally be secured to housing 15 by screws 26 or the like in a conventional manner.

A metal proximity detector 27 includes electrically responsive means 28 mounted within housing 15 adjacent the open position of clapper 16. The electrically responsive means 28 is operable, as will be explained hereinafter, for providing a change in electrical signal whenever clapper 16 is not located at its open position.

Figure 2:
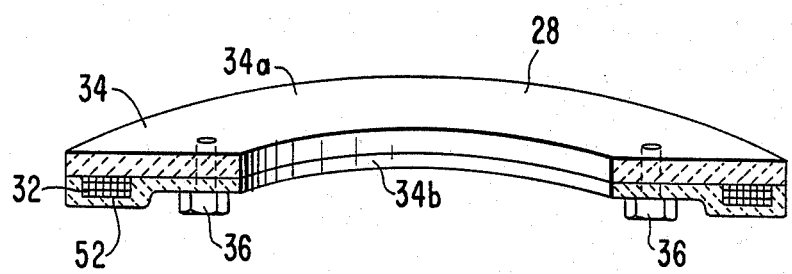
FIG. 2 is a partial, perspective view of the detector of the invention.

In its preferred form, as illustrated in FIG. 2, the electrically responsive means 28 comprises an annular search coil 32 confined in an annular ceramic housing 34. In this regard, FIG. 2 is a fragmentary view of the electrically responsive means and in actual form the same will be circular and mounted flush against surface 30 of cover 24 by mounting means such as the screws 36 illustrated in FIG. 2. Thus, housing 34 provides standoff means to insulate coil 32 from valve 10.

Detector 27 also includes electrical connections 38, electrical circuitry 40 responsive to conditions within housing 15 and means for correlating an electrical signal from circuit 40 and providing a visual indication or electrical signal.

Figure 4:
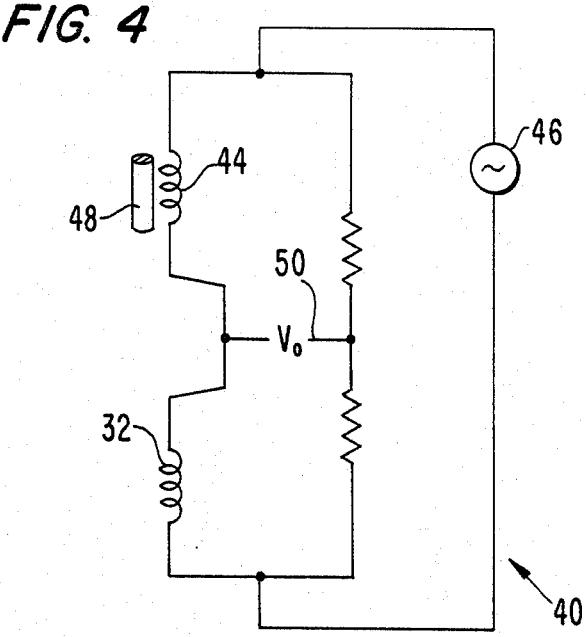
FIG. 4 is a schematic electrical diagram illustrating one form of electrical circuit useful in connection with the present invention.

The preferred electrical circuit useful in connection with the invention is illustrated in FIG. 4. In FIG. 4, the coil 32 is disposed at the indicated position in the lower left hand corner of the diagram. The circuit of FIG. 4 is a conventional inductive Wheatstone bridge circuit which includes a coil 44 and an AC signal source 46. In such circuit, a movable core 48 may be adjusted until the voltage ($V_0$) across bridge 50 is equal to zero or nearly equal to zero. The inductance of coil 32 will vary depending on the position of clapper 16 to cause a corresponding variance in the voltage across bridge 50, a voltage which can be measured to indicate movement of clapper 16.

Figure 5:
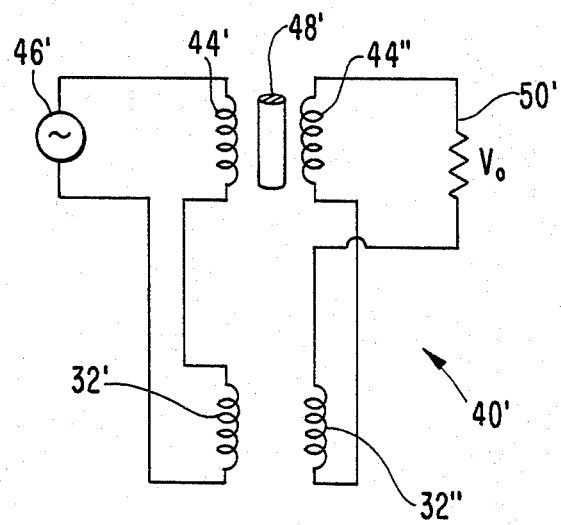
FIG. 5 is a schematic electrical diagram illustrating another circuit useful in connection with the present invention.

Another circuit which might be utilized in connection with the present invention is illustrated in FIG. 5. This circuit is similar to the circuitry illustrated in U.S. Pat. No. 3,017,621 and is designated in FIG. 5 by the reference numeral 40'. Circuit 40' is a linear variable differential transformer type circuit and includes a primary winding 32' and a secondary winding 32", each of which must be disposed inside of the valve housing. Circuit 40' includes an alternating current electrical source 46', reference windings 44' and 44" and an adjustable core 48' for initially adjusting the circuit so as to produce an initial reference voltage ($V_0$) at the segment 50' of the circuit. The voltage across line 50' ($V_0$) will vary as the proximity of the metal clapper alters the inductive coupling between coils 32' and 32".

Figure 3:
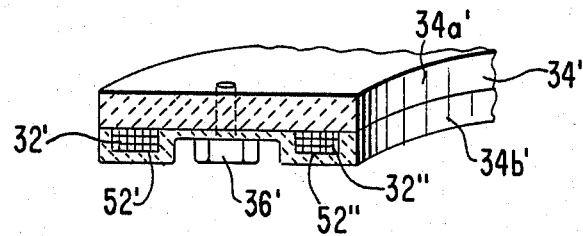
FIG. 3 is a view similar to FIG. 2 and illustrating a portion of another form of detector suitable for use in connection with the present invention.

The circuit of FIG. 5 is mounted as illustrated in FIG. 3, where the coils are held apart and insulated from cover 24 by a ceramic housing 34'. Housing 34' is attached to cover 24 by screw means including the screw 36' illustrated in FIG. 3. Housing 34' is designed to support the coils 32' in spaced relationship but is otherwise identical to housing 34 of FIG. 2.

The movement of clapper 16 away from its open position will cause a change in the induction in coil 32 of the FIG. 4 circuit or in coils 32', 32" of the FIG. 5 circuit. In either case, there will be a corresponding change in $V_0$ to indicate that clapper 16 has in fact moved away from its open position. Thus, the device of the present invention may be used to monitor the occurrence of a close valve signal transmitted to the valve closing mechanism since operation of the latter will cause the clapper to move from its open position. Also, a missing clapper is readily detected by a constant indication that the clapper is not in its open position and there is no change in electrical signal as the valve is exercised.

In its preferred form, with reference to both FIGS. 2 and 3, the electrical coil elements 32 or 32', 32" as the case may be, are generally circular and disposed to extend along the interior surface of cover 24. Moreover, in each case the elements are contained in a ceramic housing 34 or 34' which is mounted flush against surface 30. Such mounting provides a positive reference point for the electrical circuitry. The coils 32 or 32', 32" are preferably made up of copper wire insulated with a high temperature ceramic coating and the same are bonded within a groove 52 in the FIG. 2 structure or within grooves 52' and 52" in the case of the FIG. 3 structure. The grooves 32 and 32', 32" are formed between opposed ceramic rings 34a and 34b in the case of the FIG. 2 structure and between ceramic rings 34a' and 34b' in the case of FIG. 3 structure. The rings 34a and 34b on the one hand and the rings 34a' and 34b' on the other hand may be cemented together using a high temperature Saureisen cement. Preferably the insulation material is selected for its durability and machinability and such material are well known in the art. Leads for the wires extending from the inside of the valve to the outside of the valve may be small diameter tubes and again, such leads are conventional and do not form a portion of the present invention.

In use, the circuitry of either FIG. 4 or FIG. 5 is adjusted by the core 48 or 48' as the case may be to provide a no or little signal condition when the clapper 16 is in its fully open position illustrated by the solid lines in FIG. 1. When the valve is exercised by an external operator, the clapper will swing toward its closed position and relative away from cover 24. The resulting circuit imbalance is easily detected by the circuitry. This can be done periodically as a test procedure to determine that the external operator is operating properly and that the clapper indeed responds. As a failure detector, the device of the present invention is capable of detecting oscillation and hammering of the clapper that might otherwise lead to early valve failure. Moreover, a missing clapper will create a permanent circuit imbalance which would be promptly detected so as to prevent turbine damage.

The valve of the present invention may be utilized to verify (1) actuator response to a close valve signal, (2) correct functioning of the mechanical linkage between the external operator and the valve shaft, (3) free rotation of the valve shaft, (4) that the clapper is not loose on the shaft in response to shaft rotation, and (5) that the clapper is indeed attached to the arm.

I claim:

1. A steam turbine extraction line non-return valve, said valve comprising:
   a housing;
   a clapper swingably mounted in the housing for angular movement between open and closed positions;
   a metal proximity detector including electrically responsive means comprising at least one coil element mounted within the valve housing adjacent said open position of the clapper for providing a change in electrical signal whenever said clapper is not located at its said open position; and
   a ceramic housing mounted flush against an interior surface of the valve, said coil element being contained in said ceramic housing.

2. A steam turbine extraction line non-return valve, said valve comprising:
   a housing having an access opening;
   a cover for said opening;
   a clapper swingably mounted in the housing for angular movement between open and closed positions; and
   a metal proximity detector including electrically responsive means mounted within the housing on the interior surface of said cover and adjacent said open position of the clapper for providing a change in electrical signal whenever said clapper is not located at its said open position.

3. The invention of claim 2 wherein said electrically responsive means is generally circular and disposed to extend along said surface.

4. The invention of claim 2 wherein said electrically responsive means comprises at least one coil element.

5. The invention of claim 4 wherein said one element is confined in an annular ceramic housing mounted flush against said surface.

* * * * *